US009696605B2

(12) United States Patent
Russo et al.

(10) Patent No.: US 9,696,605 B2
(45) Date of Patent: Jul. 4, 2017

(54) OPTICAL PHASED ARRAY USING STACKED PARALLEL PLATE WAVE GUIDES AND METHOD OF FABRICATING ARRAYS OF STACKED PARALLEL PLATE WAVEGUIDES

(71) Applicant: BAE Systems Information and Electronics Systems Integration Inc., Nashua, NH (US)

(72) Inventors: Peter N. Russo, Nashua, NH (US); Jeffrey L. Jew, Brookline, NH (US); Paul R. Moffitt, Hollis, NH (US)

(73) Assignee: BAE Systems Information and Electronic Systems Integration Inc., Nashua, NH (US)

( * ) Notice: Subject to any disclaimer, the term of this patent is extended or adjusted under 35 U.S.C. 154(b) by 0 days.

(21) Appl. No.: 15/035,333

(22) PCT Filed: Sep. 1, 2015

(86) PCT No.: PCT/US2015/047900
§ 371 (c)(1),
(2) Date: May 9, 2016

(87) PCT Pub. No.: WO2016/040049
PCT Pub. Date: Mar. 17, 2016

(65) Prior Publication Data

US 2016/0274437 A1 Sep. 22, 2016

Related U.S. Application Data

(60) Provisional application No. 62/047,266, filed on Sep. 8, 2014.

(51) Int. Cl.
*G02F 1/295* (2006.01)
*G02B 27/10* (2006.01)
(Continued)

(52) U.S. Cl.
CPC ............ *G02F 1/2955* (2013.01); *G02B 6/12* (2013.01); *G02B 27/10* (2013.01); *G02F 1/035* (2013.01);
(Continued)

(58) Field of Classification Search
CPC ........ G02F 1/035; G02F 1/292; G02F 1/2955; G02F 2201/30; G02F 2202/20;
(Continued)

(56) References Cited

U.S. PATENT DOCUMENTS 6,373,620 B1 * 4/2002 Wang ..................... G02F 1/292 359/298
6,522,794 B1 2/2003 Bischel et al.
(Continued)

FOREIGN PATENT DOCUMENTS

KR 1020110070305 6/2013
WO PCT/US2015/047900 9/2015

*Primary Examiner* — Akm Enayet Ullah
*Assistant Examiner* — Michael Mooney
(74) *Attorney, Agent, or Firm* — Scott J. Asmus; Hayes Soloway

(57) ABSTRACT

A method for fabricating crystalline dielectric material on top of metal layers to produce an apparatus for non-mechanical steering of an input laser beam is provided. The apparatus may include a plurality of stacked parallel dielectric waveguides, each waveguide of which is fabricated by separating layers of dielectric material from a donor wafer and bonding the separated layers of dielectric material to a receiving wafer. A plurality of voltages is applied across the stacked parallel dielectric waveguides. Each of the stacked parallel dielectric waveguides is electrically phase modulated to deflect an output beam in a predictable manner.

13 Claims, 11 Drawing Sheets

(51) Int. Cl.

| | |
|---|---|
| ***G02B 6/12*** | (2006.01) |
| ***G02F 1/035*** | (2006.01) |
| ***G02F 1/29*** | (2006.01) |

(52) U.S. Cl.
CPC .......... *G02F 1/292* (2013.01); *G02F 2201/30* (2013.01); *G02F 2202/20* (2013.01)

(58) Field of Classification Search
CPC .......... G02F 1/011; G02F 1/07; G02F 1/1523; G02F 1/19; G02F 1/295; G02F 1/377; G02B 6/12; G02B 27/10
USPC ............ 385/1–10, 14, 16, 22, 27, 37, 40–41
See application file for complete search history.

(56) References Cited

U.S. PATENT DOCUMENTS

| | | | |
|---|---|---|---|
| 7,215,457 | B1 | 5/2007 | Westfall et al. |
| 2007/0019919 | A1 | 1/2007 | Bloemer et al. |
| 2014/0023321 | A1 | 1/2014 | Lu et al. |

* cited by examiner

Relative Phase for TE Mode Control $$\phi = z\sqrt{\omega^2 n_{11}^2 \mu_0 \varepsilon_0 - \left(\frac{m\pi}{a}\right)^2} - z\sqrt{\frac{\omega^2 \mu_0 \varepsilon_0}{\frac{1}{n_{11}^2} + r_{13}\frac{V}{a}} - \left(\frac{m\pi}{a}\right)^2}$$

Relative Phase for $TM_o$ Mode Control $$\phi = z'\sqrt{\omega^2 n_{33}^2 \mu_0 \varepsilon_0} - z'\sqrt{\frac{\omega^2 \mu_0 \varepsilon_0}{\frac{1}{n_{33}^2} + r_{33}\frac{V}{a}}}$$

Fig. 9

OPTICAL PHASED ARRAY USING STACKED PARALLEL PLATE WAVE GUIDES AND METHOD OF FABRICATING ARRAYS OF STACKED PARALLEL PLATE WAVEGUIDES

CROSS REFERENCE TO RELATED APPLICATIONS

This Application claims rights under 35 U.S.C. §119(e) from U.S. Application Ser. No. 62/047,266 filed Sep. 8, 2014, the contents of which are incorporated herein by reference.

FIELD OF THE INVENTION

This invention relates to lasers and more particularly, to non-mechanical laser beam steering.

BACKGROUND OF THE INVENTION

An Optical Phased Array (OPA) is the specific use of spatial light modulators to steer laser beams, or aim sensors, by progressive phase modulation. Coherent laser systems, including optical communication systems, LADAR imaging systems, and infrared countermeasure (IRCM) systems, require fast pointing systems that permit random access scanning of the battlespace in order to minimize timeline overhead to point at targets of interest. Conformal, wide-field-of-view beam steering is a significant enabler of IRCM, laser communications, and LIDAR applications on tactical fixed-wing and rotary wing aircraft.

Current optical beam steering methods, most of which are based on simple mechanics, are too bulky, slow, or inaccurate. Optical phase arrays for non-mechanical laser beam steering applications are difficult to fabricate without grating lobes because the devices require spacing of waveguide elements that are less than $\lambda/2$. Existing non-mechanical pointing solutions suffer from small field of regard (FOR) and/or are limited in wavelength to the visible or short wave infrared (SWIR) bands.

Conventionally, beams of laser light are steered using lenses or mirrors. In order to steer a beam, the lenses or mirrors are moved by a motor. Existing mechanical pointing solutions suffer from large size, weight, and power requirements, low slew rates, high settle times, tight mechanical tolerances, and do not permit random access scanning. Pointing solutions that are conformal to aircraft skin are desired to reduce drag and radar cross section impact of laser systems. It is difficult to build near-hemispherical field of view with regard to mechanical pointing systems without projecting into the air stream.

Thus, a heretofore unaddressed need exists in the industry to address the aforementioned deficiencies and inadequacies.

SUMMARY OF THE INVENTION

Embodiments of the present disclosure provide a waveguide structure for non-mechanical steering of an input laser beam to an output laser beam. Briefly described, in architecture, one embodiment of the system, among others, can be implemented as follows. A plurality of stacked parallel dielectric waveguides is provided. A plurality of voltages is applied across the plurality of stacked parallel dielectric waveguides, wherein each of the plurality of stacked parallel dielectric waveguides is electrically phase modulated, wherein the output beam is deflected in a predictable manner.

The present disclosure can also be viewed as providing methods for fabricating crystalline dielectric materials on top of metal layers. In this regard, one embodiment of such a method, among others, can be broadly summarized by the following steps: separating layers of dielectric material from a donor wafer; and bonding the separated layers of dielectric material to a receiving wafer.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

FIG. 9 shows equations of phase control for a waveguide device, in accordance with the first exemplary embodiment of the present disclosure;

DETAILED DESCRIPTION

Figure 1:
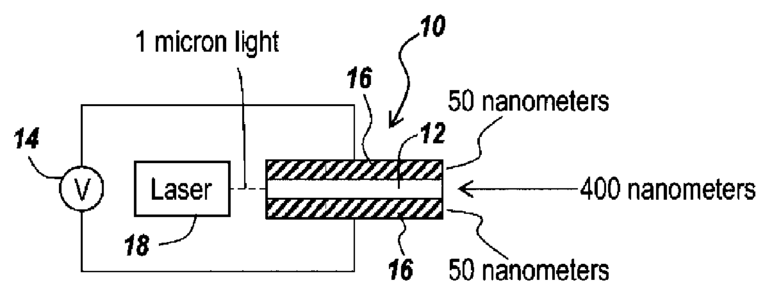
FIG. 1 is a diagrammatic illustration of a waveguide having a transparent birefringent dielectric material between waveguide plates and a voltage applied across the waveguide plates for altering the index of refraction and thus the propagation constant utilizing the linear electro-optical effect, in which the combined thickness of the dielectric material and electrodes is less than $\lambda/2$ for avoiding grating lobes to permit beam steering in a stacked waveguide configuration, in accordance with a first exemplary embodiment of the present disclosure.

The subject invention is directed to a conformal optical beam steering array utilizing an optical phased array having a near hemispherical field of regard. A stacked waveguide structure is used in which parallel plate waveguides are required. Additionally, a method is provided for phasing the output of the waveguides so as to effectuate beam steering. The present invention operates by controlling the propagation constant (βz) in stacked parallel-plate waveguides, with the propagation constant controlled using the linear electro-optic effect. To control the propagation constant, voltages are applied across the dielectric material between the plates of the parallel plate waveguides, with the dielectric material being a birefringent material that is nearly transparent in the infrared range. In one embodiment, the dielectric material is lithium niobate.

It is desirable to have a laser system in which a solid state or fiber laser is directly coupled to a broadband conformal beam-steering output aperture, without free space optics. The present invention allows direct coupling of a laser to a conformal output aperture, without free space optics. The present invention is capable of near-hemispherical coverage, high bandwidths (up to 10 kHz), arbitrary wavefront correction or reconfigurable lenses, random access beam steering, multiple beam forming, and beam spoiling.

In one example, for 1μ lasers, the stacked waveguides sandwich a 0.4 micron dielectric material between electrode plates which are 0.1 micron thick, with the spacing between the waveguides less than one half of the wavelength of the impinging laser light. The stacked waveguides may be fabricated utilizing a crystal ion slicing technique in which the thickness of the dielectric material can be made sufficiently thin to eliminate grating lobes. The phasing of the output of the multilayered waveguide may be accomplished through applying selected voltages across adjacent waveguide plates such that there is a combined constructive interference in a predetermined direction, corresponding to the desired beam direction.

More particularly, the subject invention may utilize the linear electro-optical effect which operates on asymmetric crystals, with an applied voltage basically structuring an electric field inside the crystal in order to obtain a particular index of refraction that is induced into the various axes of the crystal. As the index of refraction is changed by the application of different voltages across the crystal, the propagation constant through the parallel plate waveguide may be changed. When the voltage across two pieces of metal forming the waveguide, i.e., the two conductors, is changed, the amount of time it takes light to traverse through that particular portion of the waveguide may be modulated. By controlling the propagation times in the stacked waveguide segments, the phased array allows steering of light. Basically, what is established is a phase ramp across the face of the array. When a 2π-wrapped linear phase ramp from one side of the array to the other side is achieved, the phase of the output of the stacked waveguides may determine the direction of propagation of the light out of the stacked waveguide structure.

In order to establish a linear phase ramp, if the waveguides are spaced by less than λ/2 apart, it is possible to break up the waveguide outputs into discrete phase centers to closely approximate a linear phase ramp. The subject disclosure also focuses on how waveguides which have dielectric thicknesses less than λ/2 can be established, because without such extremely thin dielectric layers, it may not be possible to achieve beam steering. For instance, if it is sought to beam steer 1 micron laser beams, the stacked waveguide structure requires waveguides less than one half a micron thickness. It is also important to note that the orientation of the crystal between the two waveguide plates determines which direction the beam can be steered. In order to accomplish two dimensional steering, a first wave guide stack having crystals oriented in one direction is followed by a second waveguide stack having crystals oriented in an orthogonal direction. By the appropriate application of control voltages across the waveguides in each of these stacks, one can beam steer in the X and Y directions.

Moreover, it is been found that the field of regard (FOR) approximates a hemisphere, giving the beam steering system a 180° characteristic, with only the face of the waveguides available at the skin of an aircraft, thus providing a conformal system. Materials for the present invention may be selected to provide excellent performance in the short wave infrared (SWIR) through medium wave infrared (MWIR) bands. Waveguide dielectric material and device dimensions can be modified to extend capability into the long wave infrared (LWIR).

In summary, an optical phased array beam steering includes stacked waveguides having dielectric crystal material and waveguide plate combined thickness less than λ/2. Selected voltages are applied across the waveguide plates of adjacent waveguides to alter the light propagation characteristics through the waveguides so that at the face of the waveguides the outputs are phased for providing a steered laser beam. A system for fabricating the stacked waveguides with the extremely thin dielectric materials includes a crystal ion slicing technique.

OPAs used for non-mechanical laser beam steering applications are often difficult to fabricate without grating lobes for at least two reasons. First, the minimum feature sizes in photoresist-masked processes are limited by the achievable diffraction limit of the light used to pattern the photoresist. Second, macro-sized apertures are required (approximately 1 mm) in order to achieve a relevant laser beam divergence. The present invention steers coherent laser radiation via an OPA of parallel plate waveguides, with voltage controllable propagation constants. The architecture allows for beam steering from 350 nm to 5 μm. Further, the present invention builds waveguides or receiving wafers up rather than etching waveguides out. Building up waveguides bypasses the issues with minimum feature size and the creation of high aspect ratio structures. Devices that are smaller than the diffraction limit of light used in a photoresist mask layer can be achieved because, as will be discussed, the waveguide dimensions are set by the voltage used during ion implantation and by metal deposition.

Using stacked parallel plate waveguides to solve problems with OPAs requires a structure of extremely high aspect ratio. This makes etching processes difficult, if not impossible, to perform. The stacked parallel plate waveguides require optical quality dielectric material, which is crystalline and of known orientation rather than amorphous or polycrystalline material. This makes growing the material on top of a metal electrode difficult, as the crystal is not lattice matched to the amorphous metal. As will be described, the combination of a thermo-compression bond and crystal ion slicing liftoff reduces process complexity by eliminating the need for a dedicated adhesion layer in the waveguide. The present invention method uses crystal ion slicing and thermo-compression bonding in order to build layers of crystalline dielectric material on top of metal layers. The present invention method also builds a flat layer so there are no high aspect ratio structures that are either etched or grown.

Each waveguide consists of a dielectric material that is nearly transparent in the infrared region and exhibits the linear electro-optic effect in that the index of refraction changes with an applied electric field. The waveguide dielectric is coated on either side with a conductive material, and this conductor serves at least two purposes: it is an electrode that is used to generate a low-frequency electric field for electro-optic modulation of the dielectric and it also serves as the plates in the parallel plate waveguide. In this technique, thin layers of dielectric material are removed from a donor wafer or several donor wafers while sequentially or simultaneously being bonded to a waveguide device using thereto-compression bonding. This method has several steps and may be repeated as necessary to build the desired parallel plate waveguide array.

The present invention permits extremely high steering BW (limited by capacitive load or current drive capability of electronics), formation of multiple beams, beam spoiling, use as a tunable lens through arbitrary phase formation, and wave front correction to correct for other optics in the system. The IR beam steering device may be a stack of parallel plate waveguides. The present invention is capable of near hemispherical (up to +/−90° in both axes) beam steering without grating lobes for wavelengths greater than 2 μm because the geometry of the present invention permits waveguides spaced at λ/2 or less. In practice, the maximum achievable steering angle will be given by the phase noise and bias that can be achieved when controlling the device. Ideally, the present invention would be small in size (less than 1 mm×1 mm×1 min) and have no moving parts. The present invention operates by electrically phase modulating each waveguide in a linear array of waveguides. By applying techniques established for phased array antennas, the phase at the output of the stacked waveguides can be set to deflect the output beam of light in a predictable manner.

FIG. 1 is a diagrammatic illustration of a waveguide having a transparent birefringent dielectric material between waveguide plates and a voltage applied across the waveguide plates for altering the index of refraction and thus the propagation constant utilizing the linear electro-optical effect, in which the thickness of the dielectric material is less than λ/2 for avoiding grating lobes to permit beam steering in a stacked waveguide configuration, in accordance with a first exemplary embodiment of the present disclosure. An optical waveguide 10 with the appropriately thin, crystal dielectric transparent material 12 is shown injected with 2μ a laser light from a laser 18. The ability to alter the speed at which light traverses the transparent dielectric 12, and therefore alter the phase of the light emanating from the waveguide 10, is controllable through the application of a voltage 14 across metal plates 16.

The phenomena which varies the propagation through the waveguide 10 is the linear electro-optical effect, such that when a voltage 14 is applied across the dielectric transparent material 12, there is a change in the index of refraction induced in various axes of the crystal of the dielectric transparent material 12. Since the crystal is anisotropic, the application of the electric field in the x-axis, y-axis or z-axis will induce different changes in the index of refraction of the materials in the various axial planes. It is therefore important to control how the crystal is oriented in the parallel plate waveguide by selecting how the crystal is oriented between the electrodes. The two electrodes form the waveguide itself. If an electric field is set up in the waveguide across the linear electro-optic material, as the index of refraction changes, the propagation constant through the parallel plate waveguide is changed. In other words, when the voltage across the two electrodes changes, it modulates the amount of time it takes light to traverse through that particular portion of the waveguide. Controlling the amount of time it takes light to travel in a stack of waveguides, if properly controlled, allows the ability to steer the light from a number of waveguides in the same way that phased arrays operate in the microwave region of the electromagnetic spectrum.

By controlling the speed of light through the stacked waveguides, it may be possible to emulate a phase ramp to obtain a discrete emulation of the continuous phase ramp, so as to have a 2π-wrapped linear phase ramp from one side of the array to the other. If the waveguides can be spaced by less than λ/2 apart from each other, the breakup of the discrete phase centers may be close enough to the linear phase ramp that it is possible to achieve a change in direction of the beam from the array through phasing. Because of the thinness of the dielectric, and also a spacing between adjacent plates less than λ/2, grating lobes are eliminated.

In one embodiment, the dielectric material is lithium niobate with metal against the lithium niobate dielectric. When these structures are stacked one on top of the other, waveguide spacing must be less than 0.5 microns for 1 micron light. If the dielectric thickness is at 0.4 microns, the metal thicknesses must be 100 nanometers or less. The result is that each waveguide is approximately 500 nanometers (0.5 microns) in thickness.

Figure 2:
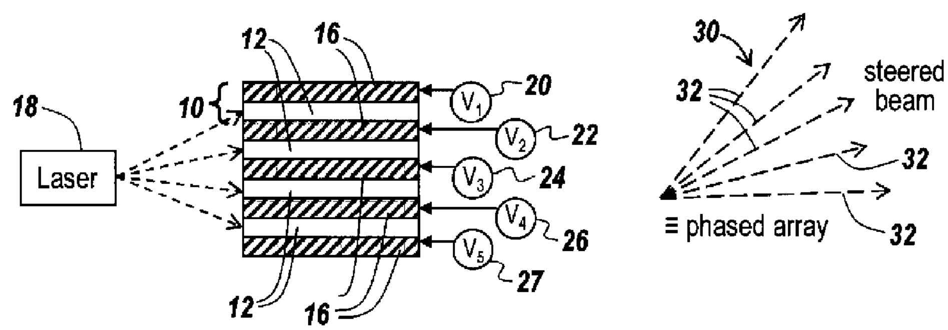
FIG. 2 is a diagrammatic illustration of a number of waveguides of FIG. 1 arranged in a stacked configuration, with predetermined voltages applied across the waveguide plates to provide a $2\pi$-wrapped linear phase ramp, with the $\lambda/2$ spacing between the waveguide plates breaking up the array into discrete phase centers close enough to approximate the linear phase ramp, thus to provide beam steering, in accordance with the first exemplary embodiment of the present disclosure.

FIG. 2 is a diagrammatic illustration of a number of waveguides of FIG. 1 arranged in a stacked configuration, with predetermined voltages applied across the waveguide plates to provide a continuous linear phase ramp, with the λ/2 spacing between the waveguide plates breaking up the array into discrete phase centers close enough to approximate the linear phase ramp, thus to provide beam steering, in accordance with the first exemplary embodiment of the present disclosure. As shown, a number of waveguides 10 are stacked one on top of the other and spaced apart by dielectric material 12 and metal 16. As illustrated, laser 18 projects light into the proximal ends of the waveguides 10 after which it travels down the length of the waveguides 10 in accordance with the index of refraction of the transparent dielectric material 12. The propagation times are determined by the voltages $V_1$, $V_2$, $V_3$, and $V_4$, 20, 22, 24, and 26, respectively. With proper control and phasing, the resultant output beam 30 may be steered in the direction of the dotted arrows 32.

When stacking waveguides, it is possible to vary the speed of propagation based on electric control. The phase of the light beam from one waveguide 10 may be shifted by 0°, with the next adjacent waveguide 10 having the phase of the light shifted by 0+ delta, 0+2 delta . . . 0+ X delta. To achieve beam steering, the differential voltage between two adjacent pieces of metal is critical. If reasonable voltages are maintained, it is possible to cascade through each one of the voltages applied to the control plates. Spacing is also important. If it is desired to steer a two micron light, for example, in order to avoid grating lobes, the requirement is to have the waveguides 10 spaced by one micron or less. If the wavelength at which the waveguide is intended to operate is divided by two, the resulting distance is how close the waveguides 10 need to be spaced with respect to each other. If this constraint is not observed, and steering beyond a particular angle occurs, the result may be a secondary beam, or in some cases, more than two beams that are directed somewhere else other than the intended direction.

FIGS. 3A-3I are illustrations of the method steps for forming the extremely thin dielectric layer for the waveguides of FIGS. 1 and 2 utilizing a crystal ion slicing technique, in accordance with the first exemplary embodiment of the present disclosure. Specifically, FIGS. 3A-3I depict a system for forming the appropriate thickness of dielectric material between parallel metal plates. The goal is to deposit a metal on top of a piece of lithium niobate substrate and then break off an appropriate thickness of lithium niobate that can be used as the dielectric sandwiched between two metal plates.

Figure 3A:
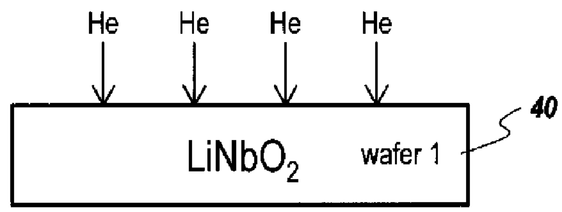
FIGS. 3A-3I are illustrations of the method steps for forming the extremely thin dielectric layer for the waveguides of FIGS. 1 and 2 utilizing a crystal ion slicing technique, in accordance with the first exemplary embodiment of the present disclosure.
Figure 3B:
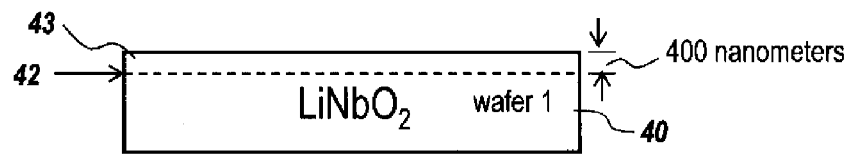

As can be seen in FIG. 3A, a lithium niobate ($LiNbO_2$) wafer 40, also denoted as 'wafer 1', is cut in the proper orientation for the particular waveguide that is being fabricated. Then, helium ions (He) are implanted through the top surface of the lithium niobate wafer 40. The helium ions are implanted through the top surface of the lithium niobate wafer such that the ions are implanted to a depth inside the wafer, as shown in FIG. 3B. This implantation is done in an ion implantation process, with the speed of implantation choosing the particular depth. The implanted helium ions create a dielectric layer or stress layer 43 near the top surface of wafer 40, the isolating dielectric region from the rest of wafer 40 at implantation line 42. In one embodiment, the ions are planted down to a one micron depth, such that the stress layer 43 is at a depth of one micron.

Figure 3C:
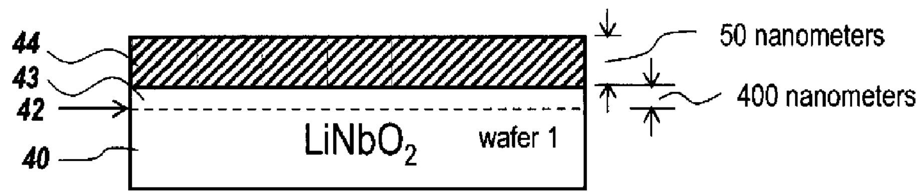

Referring to FIG. 3C, the next step is to provide a metallization layer 44 on top of the isolated dielectric region having stress layer 43 formed above implantation line 42 of the wafer 40. In one embodiment, providing the metallization layer 44 involves deposition of titanium followed by gold, with the titanium capable of bonding the gold on to the top surface of the lithium niobate wafer 40. The use of the metallization layer 44 may allow subsequent removal of layers in the structure. It will be noted that, in one embodiment, metallization layer 44 includes approx. 100 Å (0.01 microns) of titanium to allow bonding of about 400 Å (0.04 microns) of gold.

Figure 3D:
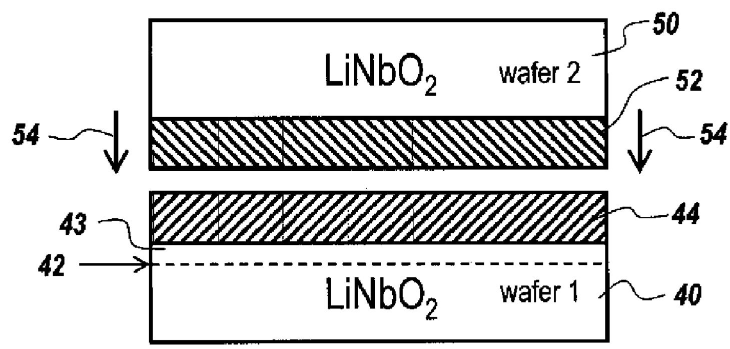
Figure 3E:
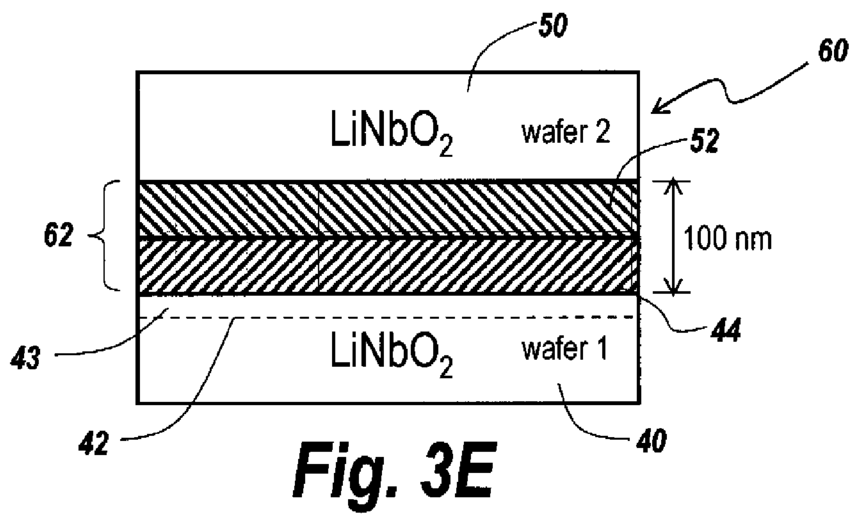
Figure 3F:
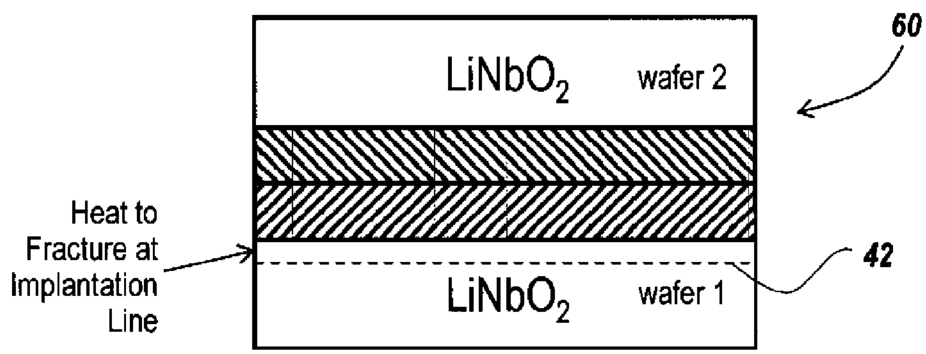
Figure 3G:
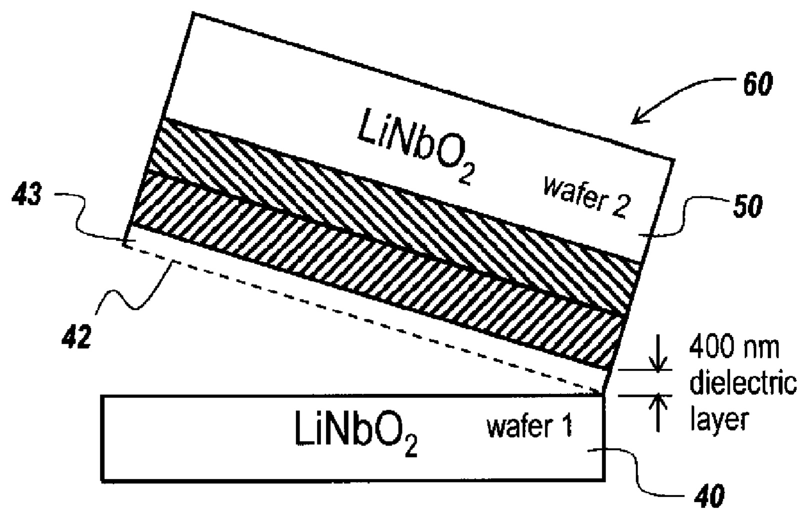

As illustrated in FIG. 3D, a second wafer 50, denoted by 'wafer 2', may be provided, wherein the second wafer 50 has the same or similar construction to the wafer 40 of FIG. 3C. The second wafer 50 has a metallization layer 52 which is positioned on top of metallization layer 44 of wafer 40, as illustrated by arrows 54, and a thermal compression bonding step may be used to bond the metallization layer 52 to metallization layer 44. As illustrated in FIG. 3E, after thermal compression bonding, the resultant structure 60 includes a thermal compression bonded area 62 including metallization layers 52 and 44, with the metallization layers having a total thickness of 1000 Å (0.1 microns). As illustrated in FIG. 3F, by heating structure 60, it is possible to create a stress crack or fracture at the implantation line 42. Once having achieved the stress crack or fracture at the implantation line 42, the structure 60 may be lifted from wafer 40 and the stress layer 43 of the dielectric layer may separate from the wafer 40 at the implantation line 42, as illustrated at FIG. 3G. In this manner, wafer 50 is provided with a thin dielectric layer 43 with thickness controlled by the depth of the implantation line 42.

Figure 3H:
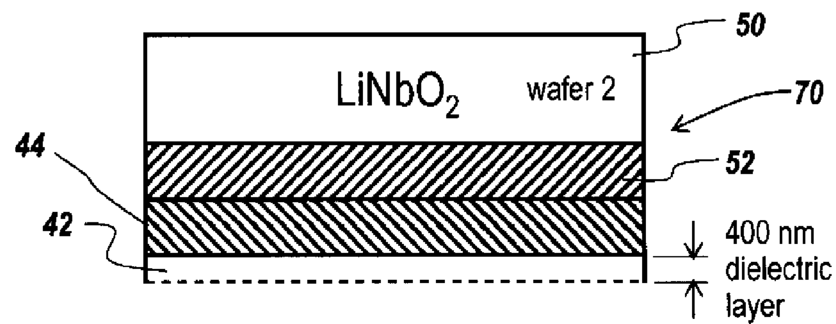
Figure 3I:
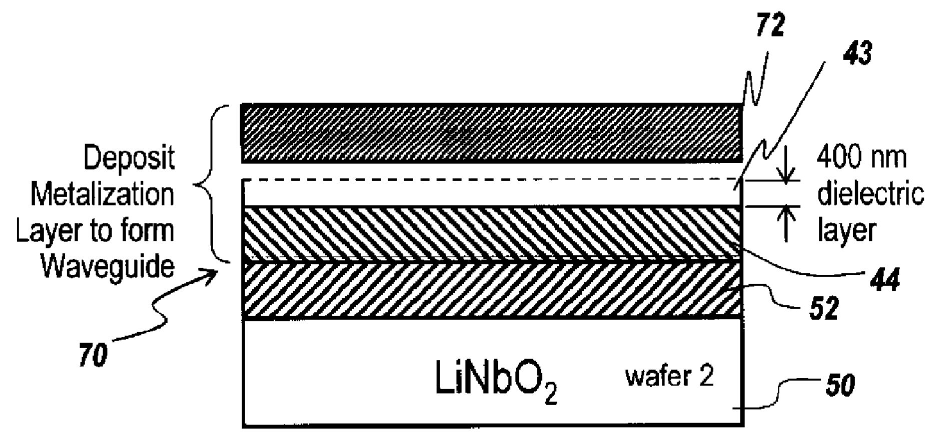

Referring now to FIG. 3H, the result of the separation step in FIG. 3G is illustrated as structure 70, in which the second wafer 50 has two metallization layers 44 and 52 with dielectric layer 43 at the bottom thereof. This structure 70 constitutes a single waveguide. After inverting structure 70 of FIG. 3H, as illustrated in FIG. 3I, an additional top metallization layer 72 is deposited on top of dielectric layer 43 to complete an optical waveguide structure including metallization layers 72 and 44. The spacing between layers 72 and 44 is dictated by the thickness of the dielectric layer 42. In one embodiment, the thickness is one micron of lithium niobate.

Figure 4A:
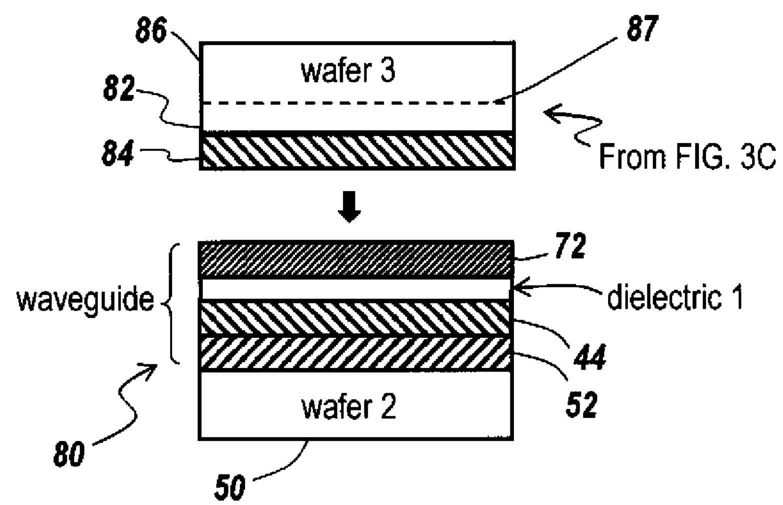
FIGS. 4A-4C are diagrammatic illustrations of the utilization of the crystal ion slicing technique of FIGS. 3A-3I for providing the stacked waveguide structure of FIGS. 1 and 2, in accordance with the first exemplary embodiment of the present disclosure.
Figure 4B:
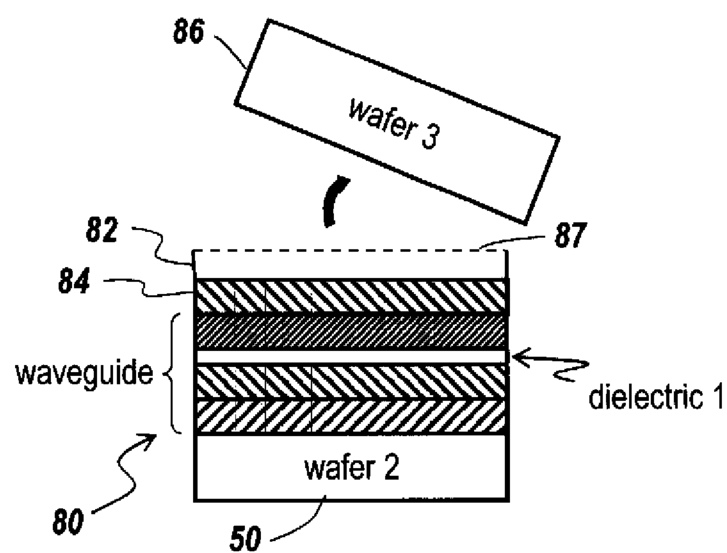
Figure 4C:
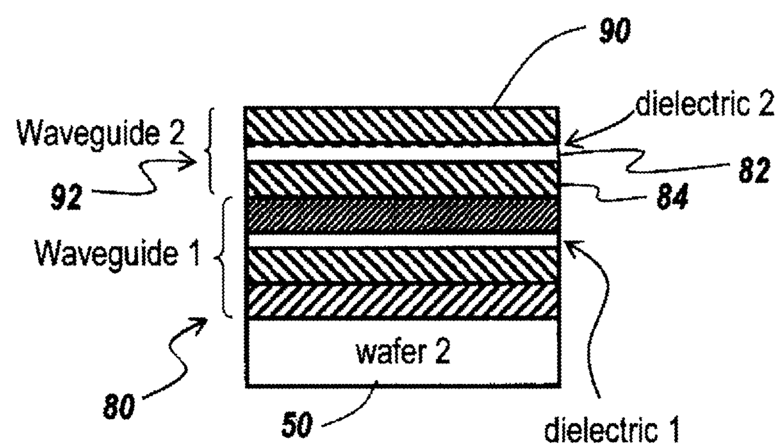

FIGS. 4A-4C are diagrammatic illustrations of the utilization of the crystal ion slicing technique of FIGS. 3A-3I for providing the stacked waveguide structure of FIGS. 1 and 2, in accordance with the first exemplary embodiment of the present disclosure. Specifically, FIGS. 4A-4C illustrate how it is possible to achieve a stacked wave guide structure. As shown in FIG. 4A, structure 80, which is the result of the processing illustrated in FIG. 3I, is provided with a third wafer 86, denoted as 'wafer 3', which is identical to the structure shown in FIG. 3C and is inverted so that it can be placed on top of structure 80. Here, it, can be seen that third wafer 86 is provided with a metallized layer 84 corresponding to metallized layer 44 of FIG. 3C and has a helium implanted region 82 which will form the second dielectric layer that is fracturable along dotted line 87. Metallization layer 84 is bonded to metallization layer 72 in a thermal compression bonding technique, such as that described in FIG. 3E. Then, as illustrated in FIG. 4B, heat is applied such that a fracture occurs along dotted line 87, at which point wafer 86 is removed after the fracture. Referring now to FIG. 4C, after removal of wafer 86, a metallization layer 90 is deposited on top of dielectric layer 82 which is now exposed. With the metallization of dielectric layer 82, a second waveguide structure 92 is formed on top of the first waveguide structure 80. The process described with respect to FIGS. 4A-4C may be continued until the required number of waveguide structures are stacked one on top of the other. In one embodiment, there may be as many as 1000 such stacked wave guides to make up the non-mechanical beam former.

In summary, the present invention implants ions into a donor wafer at a depth corresponding to the desired dielectric thickness. Metal is deposited onto both the donor wafer and the receiving (waveguide) wafer. The donor wafer is placed and aligned onto the receiving (waveguide) wafer so that there is a metal-metal interface. Applying heat and pressure to the wafers creates a thermo-compression bond, which bonds the metal-to-metal interface. Afterwards, the donor wafer can be fractured at the ion implantation layer due to thermal stress. The wafers can be polished mechanically or chemically to achieve a desired surface smoothness. Metal is deposited on the receiving (waveguide) wafer. Waveguides can be stacked to arbitrary heights using this technique.

The serial waveguide deposition process may add one waveguide at a time to the top of a waveguide stack. Useful waveguide stacks may be composed of hundreds of waveguides or more, and can take impractically long time to manufacture using the serial waveguide process. Waveguide stack fabrication time can be exponentially reduced through simple modifications to the fabrication process. For instance, waveguide stacks can be doubled in height in one process step by flip-bonding one waveguide stack to another waveguide stack. This process can be performed using full-size wafers or diced waveguides. In the case of diced waveguides, the height of a waveguide stack can be doubled many times using chips harvested from a single wafer.

Figure 5:
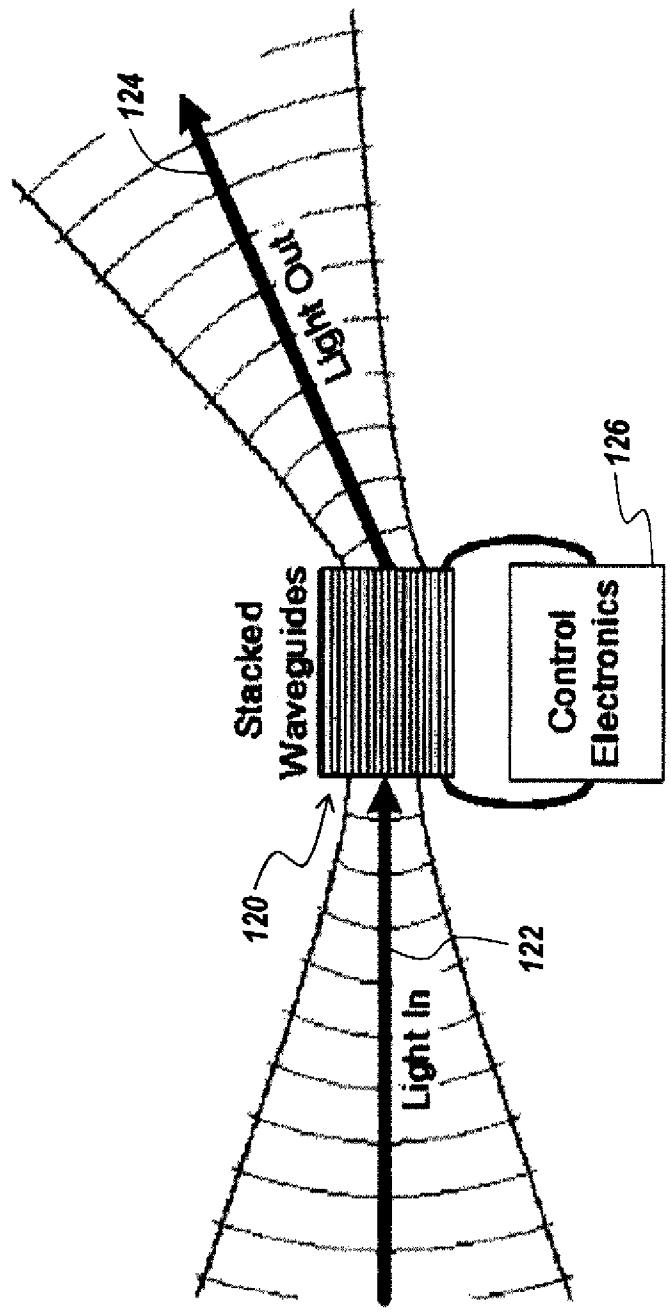
FIG. 5 is a perspective view illustrating the steering axis relative to the stacked plate orientation, in accordance with the first exemplary embodiment of the present disclosure.

Having been able to build up a stacked waveguide structure with ultrathin dielectric layers, it is possible to use the stacked waveguide structure for beam steering. FIG. 5 is a perspective view illustrating the steering axis relative to the stacked plate orientation, in accordance with the first exemplary embodiment of the present disclosure. As shown, stacked waveguides 120 receive light in, as illustrated by arrow 122, and deflect the light out, as illustrated at arrow 124, under the control of control electronics 126. The control electronics 126 may apply the appropriate voltages to the individual waveguides in the stacked waveguide structure 120.

Figure 6:
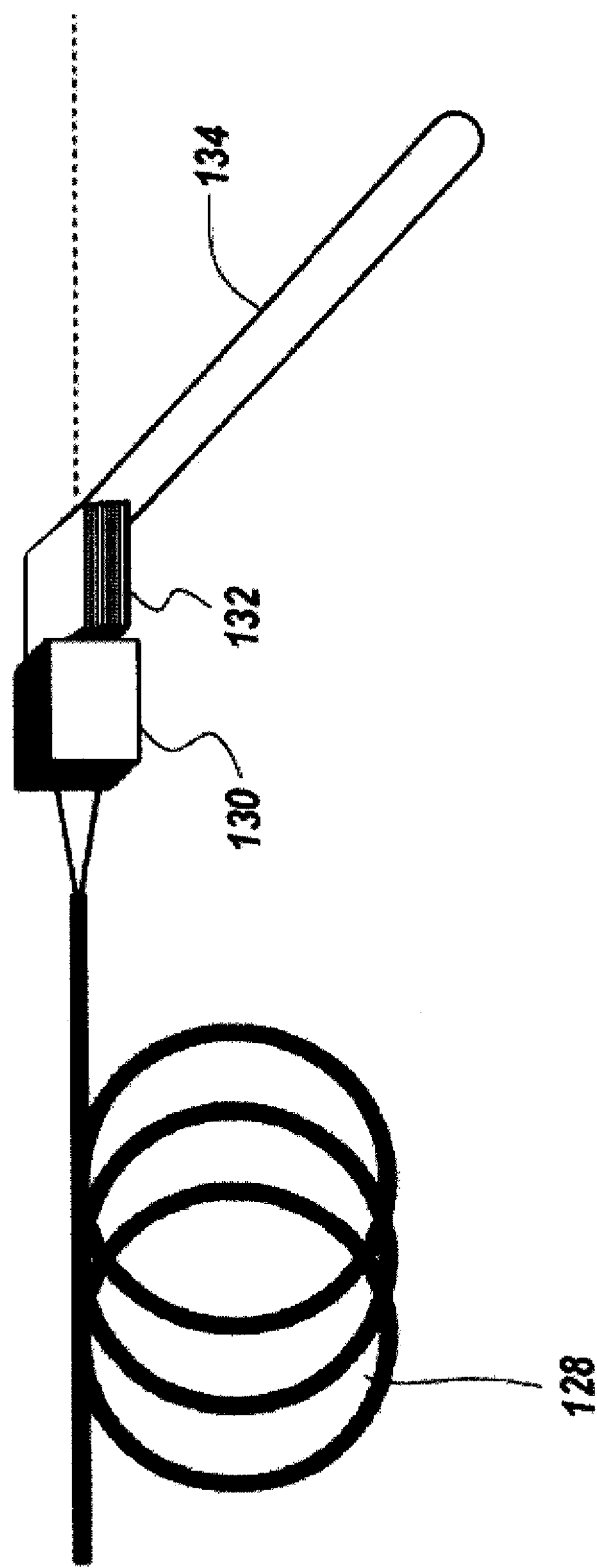
FIG. 6 is a schematic diagram showing two orthogonal waveguide structures in series to achieve simultaneous wavefront correction and two-axis steering, in accordance with the first exemplary embodiment of the present disclosure.

FIG. 6 is a schematic diagram showing the waveguide structure with two orthogonal waveguide structures in series to achieve simultaneous wavefront correction and two-axis steering, in accordance with the first exemplary embodiment of the present disclosure. This arrangement may allow non-mechanical steering of beams with up to 10 kHz bandwidth; achievement of random access scan patterns; formation of multiple beams; beam spoiling; wavefront correction or adaptive optics; and direct coupling of a laser output (free space or fiber) to the beam steering device, among other benefits.

A full two axis beam-steering structure may be comprised of two waveguide stacks. One waveguide stack 130 allows beam steering in one axis, while a second waveguide stack 132 is cascaded in series to achieve steering in a second axis. To achieve the second steering axis, the second structure may be rotated by 90° with respect to the first structure to achieve a second dimension. It is possible to achieve $\lambda/2$ waveguide spacing (for SWIR through LWIR) because of the fabrication approach used for the present invention, namely the Crystal Ion Slicing technique described in FIGS. 3-4.

In use, light delivery fiber optics 128 delivers light to a first stacked waveguide structure 130 followed by an orthogonally oriented waveguide structure 132 that diverts output beam 134 as illustrated to provide single device wavefront correction and two axis beam steering. The waveguide structure 130 will provide beam-steering control of output beam 134 in one angle and waveguide structure 132 will provide beam-steering control of output beam 134 in another angle, allowing beams to be steered in two independent directions. When the present invention is fabricated from lithium niobate ($LiNbO_3$), the device can be tuned to transmit laser beams with wavelengths in the range of 350 nm to 5.2 μm. A similar structure could be used with a cadmium sulfide (CdS) dielectric instead of a $LiNbO_3$ dielectric to achieve beam steering for lasers beams with wavelengths between 2 μm and 14 μm.

Figure 7:
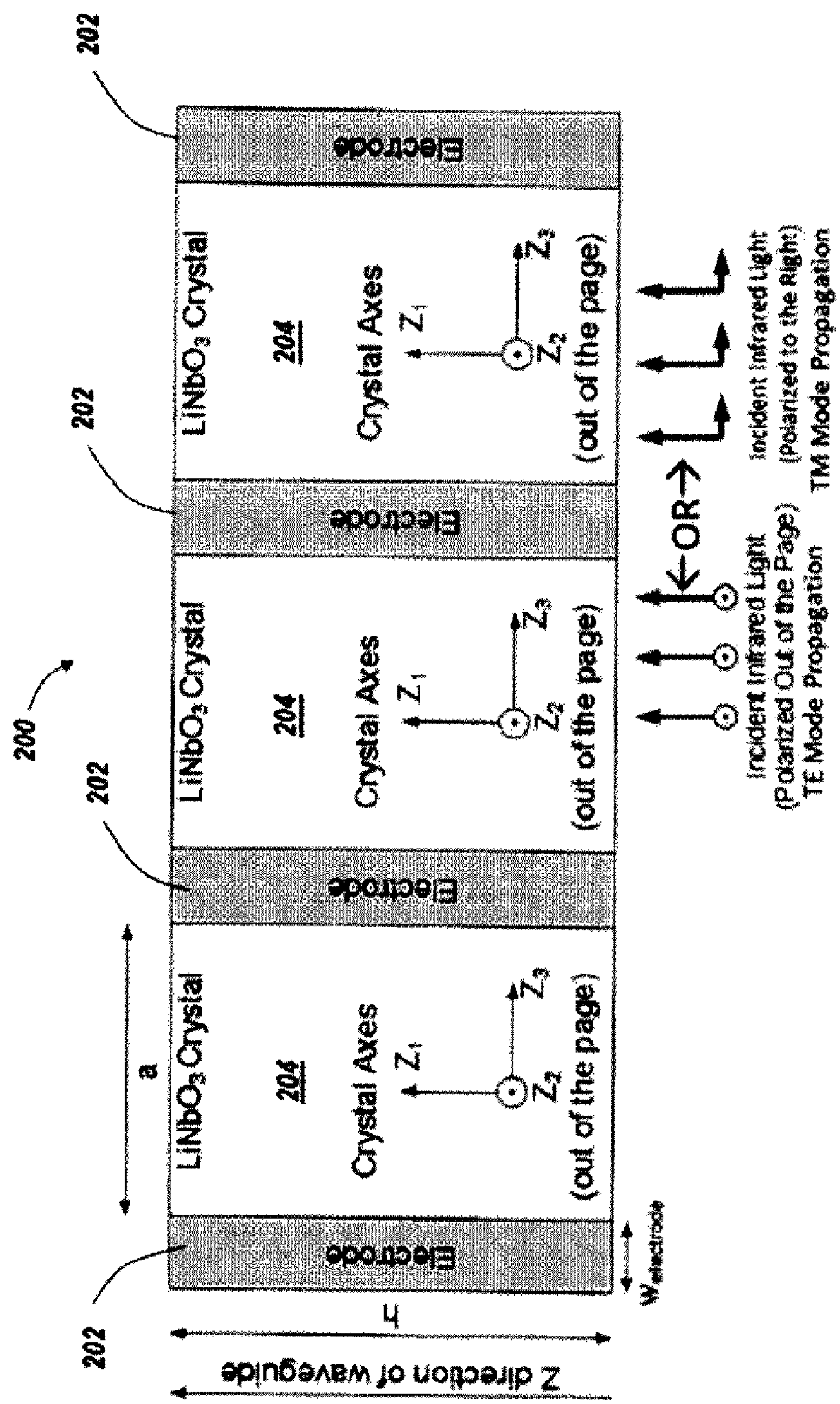
FIG. 7 is a schematic array diagram showing a device requiring Orientation of $LiNbO_3$ crystal axes relative to beam propagation and control axis, in accordance with the first exemplary embodiment of the present disclosure.

FIG. 7 is a schematic array diagram showing a device requiring orientation of $LiNbO_3$ crystal axes relative to beam propagation and control axis, in accordance with the first exemplary embodiment of the present disclosure. Here, waveguide structure 200 having crystals 204 and electrodes 202 is shown relative to incident infrared light polarized out of the page. In lithium niobate, the index of refraction is equal in the first and second crystal axes. Also, applying an electric field in the third crystal axis causes an equal change to the index of refraction in the first and second crystal axes. This orientation allows the propagation and control of both Transverse Electric (TE) and Transverse Electro-Magnetic (TEM) modes in the dielectric. In other words, the third crystal axis is the "control axis." Control signals are applied to the dielectric along the third crystal axis in the form of strong electric fields. These control fields are created by placing a differential voltage across the plates encompassing the dielectric. The control electric field in the third crystal axis then induces a change in the material's index of refraction in the first and second crystal axes.

Figure 8:
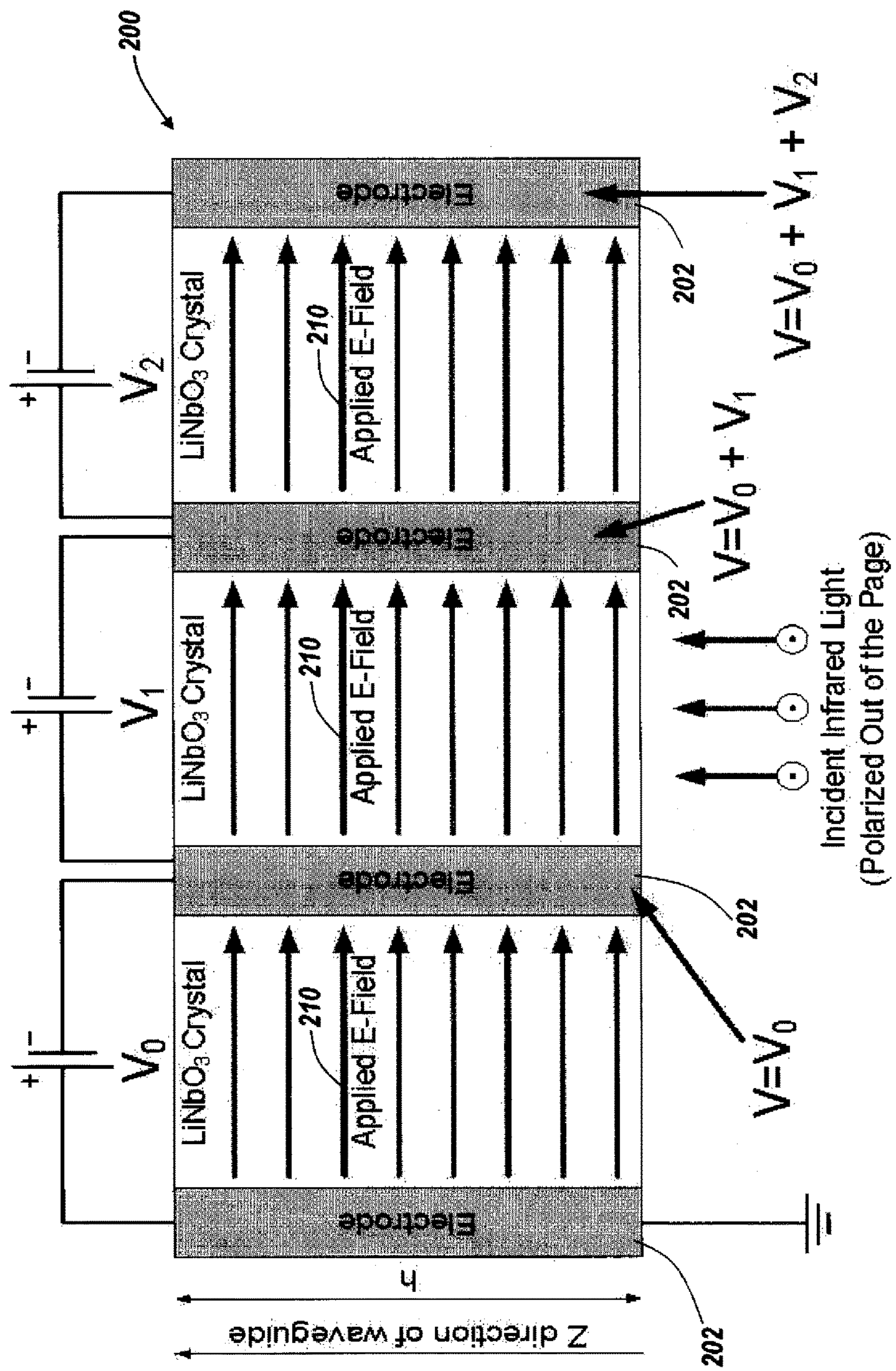
FIG. 8 is a schematic diagram showing a control voltages scheme for transverse electrode linear electro-optic device, in accordance with the first exemplary embodiment of the present disclosure.

FIG. 8 is a schematic diagram showing a control voltages scheme for transverse electrode linear electro-optic device, in accordance with the first exemplary embodiment of the present disclosure. Applying a differential voltage $V_0$, $V_1$, $V_2$ across the electrodes 202 of a parallel plate waveguide stack 200 causes an electric field 210 to appear in the direction of the third crystal axis of the structure, labeled as Z. If lithium niobate is used as the dielectric material in the parallel plate waveguides, then this electric field will cause the index of refraction to change equally in the first and second crystal axes. The index of refraction in the direction of the third crystal axis will change more than it does in the first and second crystal axes.

The present invention works by controlling the propagation constant of light through each waveguide by applying an electric field across the waveguide. A modulation in the waveguide's propagation constant induces phase delay at the output of the waveguide. FIG. 9 shows equations of phase control for a waveguide device, in accordance with the first exemplary embodiment of the present disclosure. Specifically, FIG. 9 shows equations to calculate the phase of light exiting an individual waveguide in the array. Relative to the equation of FIG. 9, z is the length of the waveguide in the direction of propagation, ω is the angular frequency of the light passing through the waveguide, $n_{11}$ is the index of refraction in the first and second crystal axes and $n_{33}$ is the index in the third crystal axis, m is the mode number, a is the width of the dielectric, $r_{13}$ and $r_{33}$ are linear electro-optic coefficients, and V is the voltage applied across the dielectric.

Light will propagate in Transverse Electric (TE) modes if it is polarized with the electric field parallel to the electrodes, and in TM modes if it is polarized with the electric field perpendicular to the electrodes. By modulating the index of refraction of the dielectric material, the phase at the output of each waveguide can be modulated. The propagation constant for TE and TEM modes in a parallel plate waveguide depends on the index of refraction of the dielectric material. If light enters the waveguide with the magnetic field polarized parallel to the device electrodes, then the incident light will propagate as TEM (also called $TM_0$) waves inside the structure. Or, if light enters the waveguide with the electric field polarized parallel to the device electrodes, then the incident light will generate TE waves inside the structure While the present invention has been described in connection with the preferred embodiments of the various Figures, it is to be understood that other similar embodiments may be used or modifications or additions may be made to the described embodiment for performing the same function of the present invention without deviating therefrom. Therefore, the present invention should not be limited to any single embodiment, but rather construed in breadth and scope in accordance with the recitation of the appended claims.

What is claimed is:

1. A method for fabricating a waveguide suitable for non-mechanical steering of an input laser beam having a laser wavelength, the waveguide comprising crystalline dielectric material on top of metal layers, the method comprising:

creating an implantation line in a donor wafer of dielectric material by implanting ions into the donor wafer to a predetermined distance beneath a top surface of the donor wafer, the predetermined distance being controlled and defined by a speed of implantation the ions, a separation layer of dielectric material being thereby defined between the top surface of the donor wafer and the implantation line, said separation layer having a thickness equal to the predetermined distance, said thickness being less than one half of the laser wavelength;

applying a first metallization layer onto the top surface of the donor wafer;

separating the separation layer of dielectric material from the donor wafer by slicing the donor wafer at the implantation line; and applying a second metallization layer onto the separation layer, so that the separation layer is sandwiched between the first and second metallization layers.

2. The method of claim 1, further comprising:

applying a third metallization layer to a receiving wafer;

before separating the separation layer, placing and aligning the donor wafer onto the top surface of the receiving wafer and bonding the separation layer of dielectric material to the receiving wafer by thermo-compression bonding of the first metallization layer to the third metallization layer.

3. The method of claim 2, further comprising:

polishing at least one of the donor and receiving wafers to vary a surface roughness thereof.

4. The method of claim 1, wherein implanting ions into the donor wafer further comprises implanting Helium ions into the donor wafer to the predetermined distance into the donor wafer.

5. The method of claim 1, wherein depositing the first, second, and third metallization layers onto the donor wafer, the separation layer, and the receiving wafer respectively further comprises depositing a layer of titanium and a layer of gold onto each of the donor wafer, the separation layer, and the receiving wafer.

6. The method of claim 5, wherein the layer of gold is thicker than the layer of titanium.

7. A waveguide structure for non-mechanical steering of an input laser beam having a laser wavelength to an output laser beam, the waveguide structure comprising:

a plurality of stacked parallel dielectric waveguides, each of the dielectric waveguides having a thickness that is less than one half of the laser wavelength; and the plurality of stacked parallel dielectric waveguides including a plurality of electrodes configured to apply voltages across the plurality of stacked parallel dielectric waveguides, wherein each of the plurality of stacked parallel dielectric waveguides can be electrically phase modulated so that the output beam is deflected in a predictable manner.

8. The waveguide structure of claim 7, wherein each of the plurality of stacked parallel dielectric waveguides further comprises a dielectric layer positioned between two metallization layers.

9. The waveguide structure of claim 8, wherein a first of the two metallization layers further comprises a layer of titanium and a second of the two metallization layers further comprises a layer of gold.

10. The waveguide structure of claim 9, wherein the layer of gold is thicker than the layer of titanium.

11. The waveguide structure of claim 7, wherein the plurality of stacked parallel dielectric waveguides further comprises a first stacked parallel dielectric waveguide and a second stacked parallel dielectric waveguide, wherein the first stacked parallel dielectric waveguide is positioned abutting the second stacked parallel dielectric waveguide, wherein the first stacked parallel dielectric waveguide is oriented substantially orthogonal relative to the second stacked parallel dielectric waveguide.

12. The waveguide structure of claim 7, further comprising control electronics connected to the plurality of stacked parallel dielectric waveguides, wherein the control electronics control voltage application to individual waveguides within the plurality of stacked parallel dielectric waveguides.

13. The waveguide structure of claim 7, further comprising a fiber optics system configured to deliver the input laser beam to the plurality of stacked parallel dielectric waveguides.

* * * * *